US005534118A

United States Patent [19]
McCutchen

[11] Patent Number: 5,534,118
[45] Date of Patent: *Jul. 9, 1996

[54] ROTARY VACUUM DISTILLATION AND DESALINATION APPARATUS

[76] Inventor: Wilmot H. McCutchen, P.O. Box 701129, Houston, Tex. 77270

[ * ] Notice: The term of this patent shall not extend beyond the expiration date of Pat. No. 5,275,006.

[21] Appl. No.: 207,800

[22] Filed: Mar. 7, 1994

Related U.S. Application Data

[63] Continuation of Ser. No. 929,286, Aug. 13, 1992, abandoned.

[51] Int. Cl.$^6$ ........................................ B01D 3/10
[52] U.S. Cl. ............... 202/205.000; 62/381; 159/6.1; 159/11.1; 159/DIG. 16; 159/DIG. 40; 202/237; 202/238; 203/11; 203/22; 203/DIG. 17; 203/91; 95/261; 96/196
[58] Field of Search .................... 159/6.1, 11.1, 159/DIG. 16, DIG. 40, 13.2; 203/10, 11, 91, 22, 4, DIG. 8, DIG. 17, 24; 202/205, 238, 237; 95/261; 62/381, 48.2; 96/196

[56] References Cited

U.S. PATENT DOCUMENTS

| | | | |
|---|---|---|---|
| 3,276,259 | 10/1966 | Bowles . | |
| 3,440,804 | 4/1969 | Gleockler | 55/269 |
| 3,486,984 | 12/1969 | Sperry | 202/238 |
| 3,486,985 | 12/1969 | McGrath | 202/238 |
| 3,505,175 | 4/1970 | Zalles | 202/238 |
| 3,578,071 | 5/1971 | Johnston | 202/238 |
| 3,580,817 | 5/1971 | Schnur | 202/238 |
| 3,619,379 | 11/1971 | Bidard | 202/238 |
| 3,649,468 | 3/1972 | Bechard et al. | 202/238 |
| 3,717,554 | 2/1973 | Ruthrof | 202/238 |
| 3,725,209 | 4/1973 | Rosa | 202/238 |
| 3,779,452 | 12/1973 | Nau et al. . | |
| 3,837,491 | 9/1974 | Humiston et al. | 202/238 |
| 3,890,205 | 6/1975 | Schnitzer | 202/238 |
| 3,961,919 | 6/1976 | Lamoureaux | 55/184 |
| 3,964,884 | 6/1976 | Judith et al. | 55/184 |
| 3,973,930 | 8/1976 | Burgess | 95/261 |
| 3,997,447 | 12/1976 | Breton et al. | 210/321.68 |
| 4,093,428 | 6/1978 | Swogger | 95/261 |
| 4,097,249 | 6/1978 | Phillips et al. | 95/248 |
| 4,168,211 | 9/1979 | Pottharst, Jr. | 203/10 |
| 4,211,653 | 7/1980 | Koppe et al. | 202/238 |
| 4,264,411 | 4/1981 | Almond, Jr. | 159/27 |
| 4,270,975 | 6/1981 | Bennett | 159/27 |
| 4,273,562 | 6/1981 | Niskanen | 95/261 |
| 4,278,495 | 7/1981 | Regehr | 202/197 |
| 4,326,863 | 4/1982 | Day et al. | 96/214 |
| 4,362,536 | 12/1982 | Gullichsen | 95/261 |
| 4,375,386 | 3/1983 | Windham | 159/31 |
| 4,411,673 | 10/1983 | Jones et al. | 95/261 |
| 4,417,951 | 11/1983 | Stanisic et al. | 202/197 |
| 4,424,068 | 1/1984 | McMillan | 95/261 |

(List continued on next page.)

FOREIGN PATENT DOCUMENTS

| | | | |
|---|---|---|---|
| 2200905 | 7/1973 | Germany | 202/238 |
| 2160440 | 12/1985 | United Kingdom | 55/52 |

*Primary Examiner*—Virginia Manoharan

[57] ABSTRACT

A controlled bubble of cavitation is formed within the distilland by opposed centrifugal and centripetal forces in the plane of an afferent mesial passage. Thus a distilland surface forms around the axis of rotation, and saturated vapor is continuously stripped from this distilland surface by the work of a vapor pump, which also creates the centripetal force. The vapor vortex within this cavitation region ejects by centrifugal force whatever in it is denser than pure vapor, including any particles or droplets which may somehow become entrained in the vapor. Bubbling at the distilland surface, which might produce mist, is suppressed by centrifugal force. Vapor is compelled to follow an afferent flow path, and is scrubbed by cyclones in the afferent mesial passage. Scrubbed vapor is then withdrawn from within the distilland along the axis of rotation. No container is necessary for the distilland and no heat is added to produce evaporation. Purity of distillate in vacuum distillation is assured by cyclonic scrubbing of the vapor in the afferent mesial passage before condensation.

13 Claims, 10 Drawing Sheets

U.S. PATENT DOCUMENTS

| | | | |
|---|---|---|---|
| 4,432,775 | 2/1984 | Won | 95/261 |
| 4,474,589 | 10/1984 | Smolensky | 55/347 |
| 4,482,432 | 11/1984 | Caffes | 202/238 |
| 4,516,987 | 5/1985 | Niggemann | 95/261 |
| 4,541,850 | 9/1985 | Oda et al. | 95/261 |
| 4,566,883 | 1/1986 | Paardekooper et al. | 55/347 |
| 4,591,367 | 5/1986 | Pek et al. | 55/344 |
| 4,597,835 | 7/1986 | Moss | 202/238 |
| 4,604,109 | 8/1986 | Koslour | 95/261 |
| 4,605,495 | 8/1986 | Flynn | 209/211 |
| 4,622,103 | 11/1986 | Shirley-Elgood et al. | 202/185 |
| 4,648,890 | 3/1987 | Kidwell et al. | 55/347 |
| 4,666,561 | 5/1987 | DuFresne | 203/90 |
| 4,666,564 | 5/1987 | Zeitsch | 202/238 |
| 4,698,136 | 10/1987 | El-Allawy | 203/11 |
| 4,698,156 | 10/1987 | Bumpers | 210/321.68 |
| 4,731,159 | 3/1988 | Porter et al. | 202/238 |
| 4,731,164 | 3/1988 | Williamsom | 202/238 |
| 4,770,747 | 9/1988 | Muller | 202/176 |
| 4,770,748 | 9/1988 | Cullini et al. | 202/185.1 |
| 4,790,911 | 12/1988 | Parkinson | 202/238 |
| 4,822,455 | 4/1989 | Olrik | 202/238 |
| 4,830,053 | 5/1989 | Shaw | 137/808 |
| 4,863,567 | 9/1989 | Raley | 202/238 |
| 4,877,424 | 10/1989 | Perkola et al. | 95/261 |
| 4,925,557 | 5/1990 | Ahlberg et al. | 210/321.68 |
| 4,938,868 | 7/1990 | Nelson | 203/1 |
| 4,940,134 | 7/1990 | Aoki et al. | 202/238 |
| 5,073,262 | 12/1991 | Ahlberg et al. | 210/321.68 |
| 5,078,573 | 1/1992 | Peroaho et al. | 95/261 |
| 5,114,568 | 5/1992 | Brinsmead et al. | 96/14.52 |
| 5,275,006 | 1/1994 | McCutchen | 62/48.1 |

ROTARY VACUUM DISTILLATION AND DESALINATION APPARATUS

This application is a continuation of application Ser. No. 07/929,286, filed Aug. 13, 1992, now abandoned.

FIELD OF THE INVENTION

The present invention relates to means for fluid purification, gas scrubbers, de-misters, distillation, concentrating evaporators, desalination, and pumps. By the term fluid purification is meant the removal of unwanted substances, including gases, particles, and liquids, from a desired fluid. The term fluid includes any liquid, vapor, or gaseous phase of a substance.

BACKGROUND - WATER PURIFICATION.

There is a long felt but unmet need for compact, simple, economical, and effective means for separating pollutants from water, including salt from seawater.

Agriculture over large areas of the United States is impossible because of the brackishness of available water. Water quality also limits siting of facilities for electrical power production.

Industrial expansion is impossible without a large supply of soft water. For example, the production of a ton of aluminum requires over 300,000 gallons of water, and the production of a ton of artificial fibres requires 200,000 gallons. In food processing also, large amounts of soft water are required—one gallon of beer takes 350 gallons of water.

In addition to the need for pure feedwater, there is an even greater need for wastewater technology due to severe penalties imposed by federal and state law on producers of hazardous materials.

Purification technology for water and other liquids falls into four main categories: chemical separation, mechanical separation, reverse osmosis, and distillation.

Chemical separation includes the ion exchange process in which cations or anions are absorbed from an electrolyte solution and other ions are given off to the solution. Flocculation and precipitation of contaminants result from the addition of appropriate chemicals. The cost of chemicals, however, limits the use of chemical separation.

Mechanical separation devices include filters, flotation cells, centrifuges, and hydrocyclones. Such devices do not utilize a change of state to effect fluid separation. Present filtration technology for fine pollutants (ultrafiltration) relies on membranes, which tend to clog. Cross-flow filtration technology partially solves this problem by creating a flow across the filter surface and periodically backflushing to clear the membrane. Ultrafiltration technology is not able to achieve desalination.

Centrifuges and hydrocyclones are unable to remove viruses, bacteria, colloids, sugars, metal ions, pyrogens and other troublesome submicron contaminants because the specific gravity differential is insufficient.

Reverse osmosis technology is based on the phenomenon that pressure upon salt water will force fresh water to flow across a membrane. Desalination plants using reverse osmosis are now common. Reverse osmosis units are the most energy efficient by far of all other processes, requiring an expenditure of 6.6 KWh per cubic meter. However, fouling of the reverse osmosis membranes by oil or bacteria in the feedwater requires replacement of expensive components, so extensive pretreatment of the feedwater is necessary. The energy efficiency of reverse osmosis is offset by the high cost of installation and maintenance.

Distillation involves evaporating a distilland and then condensing a distillate from the vapor produced. Under prior art, even with vacuum distillation, heat is added to the distilland in order to achieve vapor pressure of the desired distillate.

But the heat that evaporates the distilland also facilitates undesirable chemical reactions in the distilland and scale formation on distiller surfaces. Scale necessitates chemical pretreatment of the distilland as well as frequent shutdowns for cleaning, which is probably why desalineation devices having intricate internal heat exchange surfaces have not found a wide application. Moreover, heat wastes an inordinate amount of energy.

Vacuum distillation reduces the heat needed to achieve a change of state in the distilland, but the lowered pressure causes cavitation within the distilland. The bursting of bubbles at the distilland surface sprays mist droplets, which are large enough to transport pollutants, into the vapor. The vapor must be scrubbed before condensation. The problem of entrained mist from vacuum distillation is presently addressed by towers and de-mister screens, which have the disadvantage of large size and the need for cleaning and replacement.

All distillation devices known to prior art require a distilland chamber for containing the distilland. Scaling, mist entrainment, energy efficiency, and undesirable chemical reactions due to heat are problems remaining to be solved in the arts of distillation and desalination.

BACKGROUND - VAPOR-MIST SEPARATION.

Entrainment of mist in the vapor produced by vacuum or heat distillation is a serious problem because the mist droplets are large enough to transport contaminants. The technology generally used is tower-like columns, which rely on gravity for separation. Baffles, de-misting screens, bubble caps, and arcuate jet paths are other solutions known to the an for the mist entrainment problem of distillation, evaporation, and other fluid separation technologies. Rotatable means for vapor-mist separation are not known.

BACKGROUND - GAS SCRUBBING

Gas separation is necessary in such applications as air pollution control and the purification of compressed air used for firefighters or scuba divers. Dust in the air, or oil vapor from compressors, is so fine that scrubbing is difficult. Scrubbing of natural gas to remove water and particles is presently practiced by adsorption in glycol separators. Removal of particles from flue gas or dusty gas streams through the static cyclonic scrubbers known to the art (reverse-flow or straight-through) becomes difficult when vapors are present in the gas stream, as these vapors tend to condense and clog the separator. Tangential feed through fixed vanes imparts a rotary motion to a gas entering a separation chamber, and liquids or particles in the gas impinge on the chamber walls. No cyclonic flow means known to the art comprises rotatable afferent mesial passages; all are static.

In the field of boiler technology, entrained mist droplets are scrubbed by static baffles or vertical cylindrical passages mounted over the distilland, the object of which is to cause any entrained liquid to contact a surface. Cyclonic flow produced by tangential feed of the vapor aids in this objective. The feed, of course, is under pressure from behind and is not pulled from ahead by artificial vacuum means.

In summary, the prior art of fluid separation, which includes distillation, gas scrubbing, and de-misting devices, relies on barriers or flow channelling means disposed within an axial flow path to effect separation of mist or particles from vapor or gas. All known scrubbing devices are static.

SUMMARY OF THE PRESENT INVENTION

Either the rotation of a centrifugal distilland pump submerged in the distilland, or tangential feed of distilland in the plane of an afferent mesial passage, produces a distilland vortex about an axis of rotation. By the term "afferent mesial passage" is meant a passage radially inward toward the axis of rotation, as hereinafter described in the embodiments of parallel disks and tubes. Once centrifugal force in the distilland is established by this vortex, a countervailing centripetal force in the same plane is established by a vapor pump communicating with the afferent mesial passage. The distilland tears between these two forces, and a distilland surface forms around the axis of rotation. Pressure at the distilland surface decreases to the vapor pressure of liquids present in the distilland, and once that vapor pressure is reached, the action of the vapor pump draws vapor afferently through the afferent mesial passage in a direction which is opposite to the centrifugal force in that plane. Also, dissolved gases are evolved and drawn out of the distilland by the action of the vapor pump. Dissolved gases evolve due to the low pressure caused by the opposed forces of the vapor pump and the distilland pump on distilland containing dissolved gases. The method is essentially controlled cavitation.

Once vapor pressure is established by pulling the distilland between afferent and efferent forces, the work of the vapor pump is for stripping saturated vapor from the distilland surface, thus maintaining continuous evaporation. Means for adding to the distilland heat are unnecessary to achieve change of state, therefore scaling and other undesirable chemical reactions in the distilland are avoided.

Purity of distillate is achieved by dynamic scrubbing of the vapor in the afferent mesial passage during its flow toward the axis of rotation. The differential in density between the entrained mist droplets and the distillate vapor and non-condensable gases separates out the mist centrifugally in the plane of the afferent mesial passage. Additionally, cyclonic vortices within the afferent mesial passage, which vortices have axes of rotation approximately in the plane of the afferent mesial passage, cause mist droplets to contact the surfaces defining the afferent mesial passage, and the rotation of these surfaces imparts additional angular velocity to the droplets, flinging them back into the distilland.

The vapor thus produced and scrubbed is then condensed by suitable means, e.g. by centrifugal or screw compressors or by heat exchange with the distilland or with the residue, to yield pure distillate.

Dissolved gases evolve under the low pressure produced between afferent and efferent flows in the same plane. Once evolved, such gases flow afferently, leaving the denser liquid behind. Therefore the device described is suitable for use as a de-gasser. Optimal efficiency in distillation, such as in desalination, would be obtained by de-gassing the feedwater by the method and apparatus described herein prior to the distillation process. For example, two devices as described herein would operate in series, with the first principally for de-gassing the feed to the second device.

Several devices as described herein, configured in a branching series, would separate the distilland into fractions. At each stage, a bifurcation of residue and distillate is made by evaporation at low pressure. Fractional distillation without heat is thereby possible.

No distilland chamber is necessary for distillation or evaporation because no heat is added to the distilland. Vapor pressure is maintained by opposite forces in an afferent mesial passage. Therefore, a rotating distilland pump may be submerged directly in the distilland.

Fluid separation for gases is achieved by drawing the gas mixture in a radially inward, i.e. afferent, flow path through an afferent mesial passage prior to an axial flow path. This afferent flow is against the centrifugal force of the components of the mixture, particularly the mist droplets. Cyclonic vortices within the afferent mesial passage whirl vapor entrained mist and particulates against the surfaces defining the afferent mesial passage, and rotation of these surfaces impels such pollutants efferently. The force of gravity, and aggregation in turbulent flow, also causes mist droplets and particulates to contact a surface during their attempt at afferent flow. Pure gas is sucked up the center of these cyclonic vortices and is able to complete the afferent flow path due to its lesser density.

In the preferred embodiment for desalination, condensation of distillate is facilitated by heat exchange with the distilland, and vaporization of the distilland is facilitated by the latent heat released by condensation of the distillate. The distilland remains at a temperature too low for scale to form. Thus, energy efficiency is maximized and maintenance is reduced. The surfaces defining the afferent mesial passages are continuously washed by efferently impelled mist droplets or condensate as the surfaces rotate, so buildup of solids on the surfaces is minimal during evaporation.

A centripetal pump is disclosed for condensing vapor and impelling distillate radially inward. This centripetal pump comprises rotating parallel disks connected by volute vanes. The vanes scoop up and compress vapor as they rotate. The condensate rolls afferently along the curve of the rotating vanes, along with uncondensed gases, to removal up a central hollow shaft.

Several configurations of the afferent mesial passage and the vapor pump are discussed, including rotatable multiple parallel disks normal to a hollow shaft, impeller blades on such disks to amplify the distilland vortex, helical impellers for the vapor pump, tubular afferent mesial passages, and hollow disks with holes in their surfaces. Also described is a cast plastic embodiment of the invention, comprising an annular recess in a rotating hollow disk attached to a hollow shaft, with holes in the annular recess.

OBJECTS AND ADVANTAGES OF THE PRESENT INVENTION.

The most important object of this invention is to provide means for compact, economical desalination of seawater or brackish water, thus making available cheap and abundant supplies of clean water for agricultural, industrial, and recreational purposes out of supplies contaminated by salt, slime, metals, bacteria, viruses, algae, oil, nuclear waste, organic waste, hair, suntan lotion, or other materials. The advantage of the present invention is that no heat is used to achieve distillation, no distilland chamber is necessary, and vapor scrubbing means are integral to the vaporization means.

It is also an object of this invention to provide compact and economical means for separating entrained mist from the vapor produced by vacuum or heat distillation processes, enabling production of very pure liquid for medical or industrial use, such as in processing of electronic components. The advantage of the present invention over the towers and de-misters known to prior art is that it is dynamic, not static, and it is compact. Also, unlike de-mister screens, it may be used continuously without replacement.

Another object of this invention to provide means for low-temperature evaporation of food products so as to avoid undesirable chemical reactions due to heat, with means for scrubbing vapor to assure purity of condensate.

It is an object of this intention to provide means for continuous water purification without the expense and trouble of filter media for swimming pools, aquariums, fish farms, beverage processing plants, food processing plants, pulp processing plants, and municipal wastewater processing plants.

It is also an object of this invention to provide means for providing pure vapor for use in boilers.

Solvent recovery and purification is another object of this invention, which is advantageously accomplished without heat. At the same time that the solvent is evaporated by mechanical means, suspended particles are centrifugated for collection.

It is also an object of this invention to provide simple and economical means for concentration of metals and other materials from seawater.

Another object of this invention is to provide means for purifying gases of entrained liquids and particles. The gases treated might include metal vapors used in vapor deposition, smokestack emissions, diesel exhaust, and steam.

It is also an object of this invention to provide means for fractional distillation without the use of heat.

Evaporation of the distilland cools the residue, so the waste brine from de-salination is available for use as a refrigerant. The present invention does not address cooling applications of the method and apparatus disclosed. The inventor, in a separate application, has described and claimed apparatus and methods of refrigeration.

An important object of this invention is to provide simple and economical means for removing non-condensable gases from liquids.

It is also an object of this invention to provide simple and economical means of de-watering toxic waste, including oily produced brine from drilling operations, food processing plant wastewater, nuclear waste, industrial wastewater, and sewage. The water extracted is suitable for immediate discharge or re-use.

The above applications of the fluid purification method and apparatus disclosed herein are illustrative only and not meant in any way to limit the claims or to reduce the scope of this invention. Many other applications and improvements will be obvious to those skilled in the art.

DETAILED DESCRIPTION OF THE DRAWINGS AND THE OPERATION OF THE PREFERRED EMBODIMENT AND THE ALTERNATIVES

Figure 1:
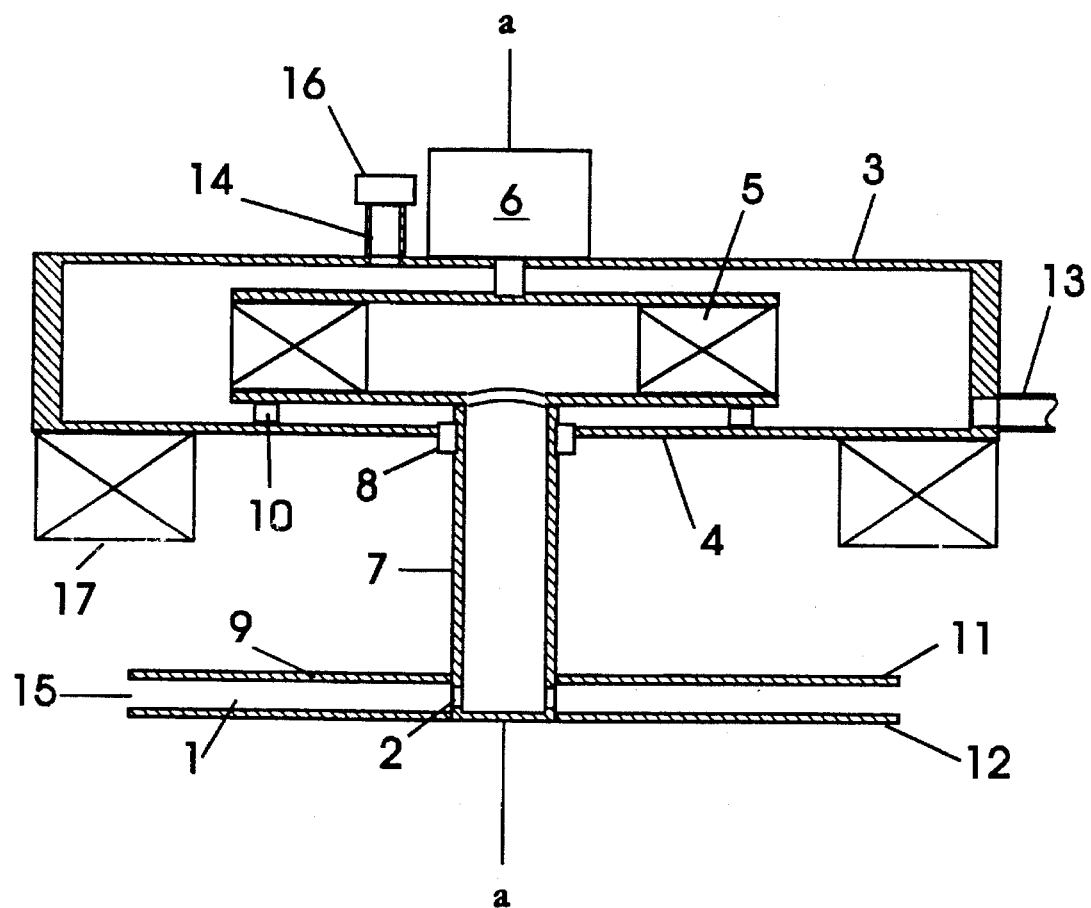
FIG. 1 shows a cross-sectional view of the preferred embodiment of this invention, for use as a water purification device for desalination.

FIG. 1 shows a cross-sectional view of the preferred embodiment of this invention, for use as a water purification device for desalination. By means of this device, evaporation and de-gassing of fluids may be accomplished without heat or a tank for containing the fluid. The preferred embodiment comprises means for condensing distillate vapor, which is a centrifugal compressor comprising a vapor pump (5) and a condensation chamber (3). The condensation chamber would not be necessary for mere evaporation or de-gassing applications.

A rotatable distilland pump (9) comprises approximately parallel disks (11, 12), which disks define between them an afferent mesial passage (1) in a plane approximately normal to an axis of rotation (a—a) which is the axis of rotation of the distilland pump. The distilland pump connects to a rotatable hollow shaft (7) having its centerline lying along the axis of rotation (a—a). A portion of the shaft extends between the disks, and said shaft portion comprises holes (2) therein which allow communication between the bore of the shaft and the afferent mesial passage (1). The disks are shown to be normal to the shaft, but other distilland pump surface configurations are possible, such as conical, convex or concave surfaces. The rotation of the shaft and the distilland pump while the distilland pump is submerged in distilland causes a distilland vortex around and having its axis of rotation approximately at the axis of rotation (a—a), which vortex impels distilland away from the axis of rotation (a—a), i.e. efferently, in the plane of the afferent mesial passage.

A vapor pump (5) connects to the shaft (7). The vapor pump need not be rotatable or centered at the axis of rotation (a—a), but in the preferred embodiment the vapor pump and the distilland pump are co-axial. Many different kinds of pumps known to the art could be used, such as positive displacement pumps, turbines, and screw-type pumps. In this embodiment, the vapor pump is a centrifugal blower and a motor (6) rotates the vapor pump, the shaft, and the distilland pump simultaneously. The bore of the shaft (7) communicates with the inlet of the vapor pump. Thus there is communication between the afferent mesial passage and inlet of the vapor pump. The outlet of the vapor pump communicates with the means for condensing vapor, i.e. the condensation chamber and the heat exchange means (4), (17).

Spacing between the disks (11, 12) depends on the desired degree of distillate purity at a given expenditure of energy. The length of the afferent mesial passage (1) in the preferred embodiment is the distance between the rim of the disks and the shaft. The width of the afferent mesial passage, i.e. the spacing between the spaced apart parallel disks, is less than the length. Closely spaced disks give the greatest separation of mist from vapor, but tend to condense and expel much of the distillate vapor. However, at places on the disk surfaces where the angular velocity exceeds approximately 50 feet per second, supercavitation will set up and provide a larger distilland surface for evaporation. The advantage to using disks having a conical cross-section is that volume at all radii from the distilland vortex axis of rotation may be kept constant so that condensation of vapor is minimized during its afferent flow.

A condensation chamber (3), separated from the distilland by a community wall (4), encloses the vapor pump (5). Means for heat exchange are connected to the condensation chamber, the heat exchange means comprising the community wall (4) and the fins (17) which extend into the distilland impeding rotation of the condensation chamber while the distilland pump rotates. The motor (6) rotates the vapor pump (5), which is a centrifugal pump of suitable design having a capacity of the volume of vapor which would produce the gallons per minute flow rate desired against the head of the distilland pump (9). For a unit producing at least 20 gallons per minute, a vapor pump having a capacity of at least 3,500 cfm would be used, assuming that there are only two gallons of water per 359 cubic feet of fluid coming up the hollow shaft (7), which fluid would include a certain amount of non-condensable gases from the distilland as well as water vapor. De-gassing of the feedwater, by a prior device of this design or other designs known to the art, would reduce the amount of non-condensables and improve efficiency.

The shaft (7) passes through the center of the community wall (4) and hermetically engages with the community wall by means of the rotary shaft seal (8). Many seals as are commonly used in the art may be suitable for the shaft seal (8), including Teflon rotary fluid seals. Preferably an additional seal (10) connects the community wall (4) and the vapor pump (5) so as to provide additional security against intrusion of distillate into the distillate in the condensation chamber (3).

The means of attachment between the disks (11, 12) of the distilland pump may be volute vanes, hole bands, normal struts, common connection to the shaft (7), or other suitable means. In this embodiment, both of the disks are attached to the shaft. One surface of each disk defines the afferent mesial passage, and the other, or outside surface, contacts the distilland, or distilland vapor and non-condensable gas produced by distilland supercavitation at high rotation speeds. The rotation of the vapor pump (5) draws a vacuum in the bore of the hollow shaft, and thereby in the afferent mesial passage, which vacuum creates a centripetal force approximately in the plane of the afferent mesial passage which opposes the centrifugal force in the same plane caused by the simultaneous rotation of the distilland pump. Between these two opposing forces, the distilland tears apart in the phenomenon known as cavitation. A distilland surface forms around the axis of rotation (a—a) and within the distilland, and the vapor pump (5) continuously strips vapor and non-condensable gases evolved from the distilland surface. Impellers on the outside surfaces of the disks of the distilland pump (9), as shown in FIG. 5, would aid in the creation of this distilland vortex in the plane of the afferent mesial passage. Planar disks without impellers, as shown here, create a zone of supercavitation at their outside surfaces according to the angular velocity of the disks and the characteristics of the distilland. The distilland surface at the supercavitation zone is a source for vapor, and the efferent flow of distilland parallel to the outside surfaces of the disks squeezes the vapor in the cavitation zone into the inlet (15) of the afferent mesial passage (1) defined by the inside surfaces of the disks. The swirling liquid distilland cannot enter the afferent mesial passage between the disks (11, 12) of the distilland pump (9) because of its increasing angular velocity in afferent flow, according to known principles of fluid control devices such as the vortex diode and vortex triode.

Once inside the afferent mesial passage, the vapor and non-condensable gases from the distilland are sucked toward the axis of rotation (a—a) along a flow path that is approximately normal to the axis of rotation. The fluid in the afferent mesial passage rotates around the axis of rotation as it goes toward the axis of rotation, therefore cyclonic vortices set up due to crossed flow vectors. The axes of these cyclonic vortices are in a plane approximately normal to the axis of rotation (a—a), so the cyclonic vortices fling entrained mist against the inside surfaces of the rotating disks (11, 12). The angular velocity of the mist increases as the mist proceeds toward the axis of rotation. Vapor and non-condensable gases proceed along the axes of these cyclonic vortices into the holes of the hollow shaft (7), while liquids are flung back into the distilland by the rotation of the disks.

De-misted vapor and non-condensable gases are drawn up the bore of the hollow shaft (7) by the work of the vapor pump (5). As vapor enters the vapor pump, the vapor expands, thus cooling it and aiding condensation. The vapor pump, which in combination with the condensation chamber (3) acts as a centrifugal compressor, presses the expanded vapor and condensed distillate against the surrounding walls of the condensation chamber (3), such pressure also aiding in condensation. Heat exchange with the distilland occurs through the community wall (4) and the fins (17). Condensation of the produced vapor in the condensation chamber (3), as well as vacuum drawn by the vapor pump, reduces the pressure in the hollow shaft (7) and in the afferent mesial passage between the disks (11, 12) of the distilland pump (9), thus aiding evaporation of the distilland.

Figure 2:
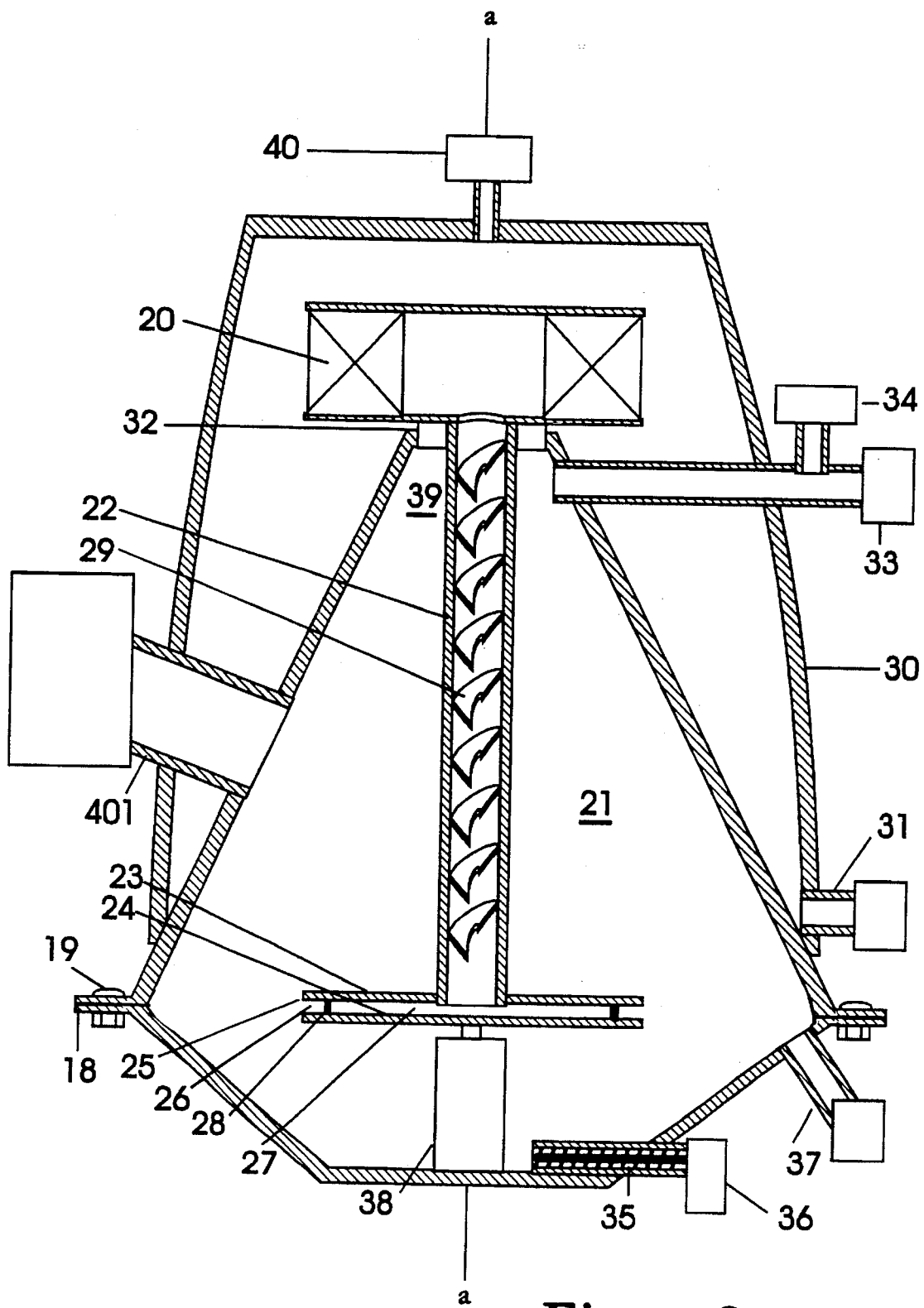
FIG. 2 is a cross-sectional view of an alternative embodiment, having a distilland tank, suitable for oil/water/solids separation and evaporation as well as desalination and de-gassing.

Fractional distillation without heat is possible by evaporating a distilland at fixed degrees of pressure at a constant temperature, e.g. by suspending a distilland tank in a larger cooling tank of constant water temperature. With the addition of a tank for containing the distilland, said tank comprising an inlet for distilland and an outlet for residue, either a cylindrical tank or a conical tank such as shown in FIG. 2, a branched series of such devices would also be means for fractional distillation without heat. Each tanked device would reliably separate vacuum evaporation products from residue without entrainment of residue in the vapor. Successive separations in a tree-like branching process would fractionate the fluid into its components, because at each stage the fluid would be separated into a light gaseous phase and a heavy liquid phase, all without heat.

It is known that the work of a pump in drawing out saturated vapor does not change the pressure within the space filled by saturated vapor, but only facilitates further evaporation. Therefore the vapor pump (5) draws out vapor once the vapor pressure is established, and the continuous stripping of saturated vapor from the distilland surface allows evaporation to proceed continuously. The vapor pump (5) could be separately driven and rotated in an opposite direction from the direction of the distilland pump in order to increase the cyclonic flow within the shaft, thereby increasing the scrubbing of the vapor by using the shaft interior as well as the disk interior as a scrubbing surface for contacting any entrained mist droplets.

Mist droplets entrained in the vapor coming off the distilland surface (15) cannot, because of their greater density and their increased angular momentum in afferent flow, follow the pure vapor in the afferent mesial passage between the disks (11, 12). Cyclonic vortices are formed in the vapor/mist mixture within the afferent mesial passage (1) by the crossed forces of the afferent pull of the vapor pump and the rotation caused by the distilland pump. These vortices impel mist droplets against the disks (11, 12). The disks then impart additional angular momentum to the mist droplets, and fling them out back to the distilland. Thus the inside surfaces of the disks are continuously washed. Gravity also causes the mist droplets to contact the interior surfaces of the disks during the flow through the afferent mesial passage defined by the rotating disks (11, 12) of the distilland pump (9).

Particles in the distilland are efferently impelled by their own centrifugal force and migrate away from the inlet (15) of the afferent mesial passage according to known centrifugation principles. Residue becomes concentrated below the distilland pump (9) as evaporation proceeds.

Any saturated vapor which may condense on the way to the condensation chamber will be pulled by the vapor pump up the shaft (7), along with any uncondensed vapor, but such condensate will be pure mist, unlike mist coming directly off the distillate.

Distillate is withdrawn from the condensation chamber (3) through the distillate pipe (13). Non-condensable gases are vented through a one-way valve (16) in the gas vent (14) located approximately at the center of the condensation chamber, the gases exiting the one-way valve are monitored and controlled by suitable means.

This device may be used for de-watering and concentrating a slurry, or as a concentrating evaporator for food or for wastewater. The water vapor produced is pure and dischargeable. Suitable means, such as tie rods or fins extending into the distilland, prevent rotation of the condensation chamber as the distilland pump rotates.

This same dynamic rotating afferent method applies to the scrubbing of steam, of contaminated air, and of vapor from any evaporation process.

FIG. 2 is a cross-sectional view of an alternative embodiment, having a conical distilland tank, suitable for oil/water/solids separation and evaporation as well as desalination and de-gassing. The distilland tank (21) comprises two conical sections engaging at a flange joint (18) by means of bolts (19). Within the distilland tank (21) and submerged in the distilland is a distilland pump, comprising disks (23, 24) lying in planes approximately normal to the centerline of a hollow shaft (22), which is also the axis of rotation (a—a) of the distilland pump. The disks define an afferent mesial passage (27) therebetween and are spaced apart a distance less than half their radii. The afferent mesial passage is approximately in the plane of the flange joint (18) and is approximately normal to the axis of rotation (a—a). The upper disk (23) is attached to the shaft (22) by suitable means and comprises a hole at its center, such that when the upper disk is attached to the shaft, the interior of the shaft communicates with the afferent mesial passage (27) between the disks through the hole. The lower disk (24) has no hole and is attached to the upper disk by struts (28), which could be volute vanes, as shown in FIG. 5. Either the upper disk or the lower disk or both may be provided with attached impellers for amplified distilland vortex creation, as shown in FIG. 5. A motor (38) rotates the disks (23, 24) defining the afferent mesial passage (27) and the shaft (22). The rotating shaft (22) and its attached disks (23, 24), which are within the distilland tank and submerged in distilland, create a distilland vortex about the axis of rotation (a—a) which impels the distilland efferently at the same time as the vapor pump (20), acting through the afferent mesial passage (27) between the disks (23, 24) draws the distilland afferently. The distilland pressure between these two oppositely directed pumps is thereby lowered to the pressure at which cavitation occurs in the distilland. A distilland surface (26) forms around the axis of rotation (a—a) and across the afferent mesial passage (27) between the disks, preferably near the rim (25) of the disks. The location of the distilland surface is determined by the pressure within the distilland tank, which pressure is created by the feedwater pump (not shown) and the rotation of the disks (23, 24) of the distilland pump. Saturated vapor of the desired distillate, here water, along with non-condensable gases and entrained mist, fills the afferent mesial passage (27).

Scrubbing of the vapor and non-condensable gases occurs by means of cyclonic vortices within the afferent mesial passage, which are caused by the crossed vectors of afferent flow and angular flow. Angular flow is caused by the rotation of the disks, and afferent flow is caused by the vapor pump. The axis of rotation of such cyclonic vortices is approximately in the plane of the afferent mesial passage (27). Mist droplets and particles are spun out from the cyclonic axes and contact the inside surfaces of the rotating disks (23, 24), which contact impels them efferently, back into the distilland.

Vapor, non-condensible gases, and condensed distillate are then propelled up the shaft by helical shaft impellers (29) disposed in the bore of the shaft (22) and connected to the shaft. The work of the vapor pump (20) also draws vapor, non-condensable gases, and condensed distillate along the axis of rotation (a—a) away from the afferent mesial passage (27). The helical shaft impellers rotate along with the disks and shaft and act as a vapor pump. Vapor gases, and distillate droplets enter the vapor pump (20), which is a centrifugal pump or other suitable pump known to the art, and are thereby impelled efferently against the walls of the condensation chamber (30). Thus the bore of the shaft communicates with a centrifugal compressor. Heat exchange occurs through the walls of the tank, which are a community wall between the tank and the condensation chamber. The latent heat given off by the condensing vapor raises the temperature of the distilland and thereby facilitates evaporation by raising the vapor pressure of the distilland. Distillate is withdrawn from the condensation chamber through the distillate pipe (31). Distillate removes heat from the system, as does heat exchange with the ambient air, but the motor (38) adds heat.

Non-condensable gases within the condensation chamber are displaced toward the axis of rotation (a—a) and to a non-condensables valve (40) by the vapor pump, which presses and condenses distillate against the wall of the condensation chamber (30). Non-condensable gases are released from the condensation chamber through the non-condensables valve, which is a one-way valve controlled and monitored by suitable means.

Oil, algae, and other low specific gravity contaminants in the distilland are squeezed inward by the centrifugal force of the swirling distilland, as in a cream separator, and concentrated at the top of the conical tank (21) near the shaft seal (32). Such light contaminants exit through the oil pipe (33). Any non-condensable gases coming through the oil pipe (33) are vented through the air vent (34). Discharge through the oil pipe is monitored and controlled by suitable means known to the art.

Materials with a high specific gravity are flung out toward the wall of the distilland tank (21). Due to the conical shape of the wall, which deflects the distilland vortex down, and the force of gravity, such materials migrate down and collect at a trough at the bottom of the tank, wherein is an auger (35). The auger (35) rotates and impels solids to the solids purge (36), which is a conduit leading from the tank to means (not shown) for processing the solids.

Residue is drawn off through a residue pipe (37), which is equipped with suitable means for controlling flow of residue from the distilland tank.

The rotation of the shaft (22) and its attached disks (23, 24) is produced by a motor (38) of suitable design, such as a submersible motor, of which many different kinds are known to the art. A mechanical seal, the shaft seal (32), engages the shaft (22) and the upper chamber apex (39), thereby sealing the distilland tank (21) from the condensation chamber (30). Many different mechanical seals known to the art could be used, including Teflon seals.

Distilland enters the distilland chamber through a distilland pipe (401) drawn by the drag of the spinning disks (23, 24) and by the withdrawal of vapor and residue from the distilland chamber by the aforesaid means, and impelled by its own head. Feedwater head is created by suitable means known to the art, such as a feedwater pump (not shown) or a reservoir (not shown). The vapor pump (20) is sized so as to overcome the efferent flow of vapor, gases, and condensate due to the distilland pump. The work of the vapor pump draws vapor up the shaft. Feed pressure though the distilland pipe is sufficient to overcome the pressure generated within the distilland tank by the rotation of the distilland pump and the shaft, and the distilland pipe is equipped with suitable means (not shown) for regulating flow into the distilland tank.

Vapor pressure is maintained, and saturated vapor and/or distillate is withdrawn, by the vapor pump (20) which is a centrifugal pump or other suitable design. The inlet of the vapor pump (20) communicates with the bore of the shaft (22). Also, the rotatable helical shaft impellers (29) are a vapor pump, performing the same function. For de-watering applications, such as for food evaporation or toxic waste treatment, water vapor might simply be vented to the atmosphere.

By the foregoing means, a four-way separation of fluids is accomplished. Oils and light contaminants go to the top of the tank and out the oil pipe, solids and heavy contaminants are centrifugated and settle to the bottom of the tank, where they are drawn off through the solids purge, residue is drawn is drawn out of the residue pipe, and distillate and non-condensable gases are withdrawn through the vapor pump. Cascading such devices in a branching series would effect fractional distillation without heat.

Figure 3A:
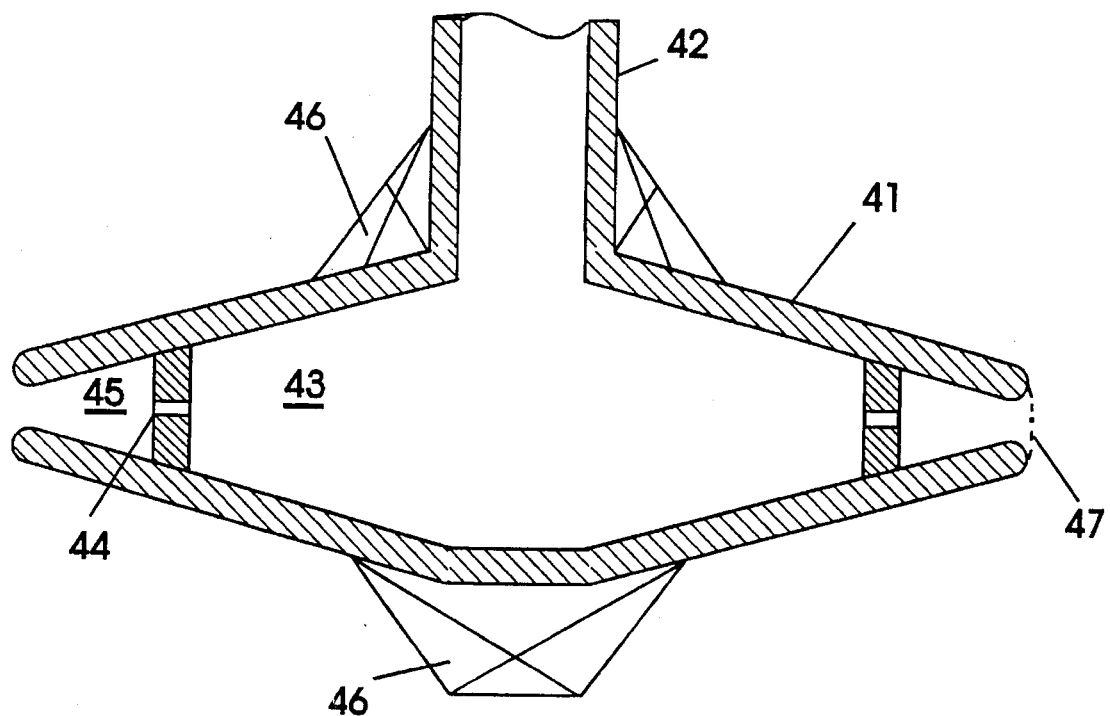
FIG. 3a shows a cross-sectional view of an alternative embodiment of a rotatable distilland pump comprising an annular recess at its rim.

FIG. 3a shows a cross-sectional view of an alternative embodiment of the distilland pump, which may be constructed out of molded plastic material, such as polyvinylchloride, for applications such as swimming pool or aquarium water purification, or for food evaporation or other uses. A rotatable distilland pump (41) is attached radial to a hollow shaft (42). The centerline of the hollow shaft (42) is approximately collinear with the axis of rotation (a—a) of the distilland pump (41). Several such distilland pumps may be mounted on one shaft. The inlet of a vapor pump (not shown), which is a centrifugal fan such as described in FIG. 1 or other suitable design of suitable capacity, communicates with the bore of the hollow shaft (42). The vapor pump is sized so as to draw vapor and condensate up the shaft against the head of the distilland pump.

The rotatable distilland pump (41) comprises approximately parallel conical elements defining an afferent mesial passage (43) therebetween which passage is disposed in a plane approximately normal to the axis of rotation (a—a). Said conical elements connect across the afferent mesial passage (43) at a connecting wall having holes (44) therethrough The afferent mesial passage comprises an annular recess (45) extending from the rim of the distilland pump to the holes (44). The annular recess communicates with the remainder of the afferent mesial passage through the holes. The afferent mesial passage (43) communicates with the bore of the hollow shaft (42).

The distilland pump also comprises efferent impellers (46) on its outside surfaces. As the distilland pump rotates while submerged in the distilland, the annular recess (45) rotates as well and a distilland vortex forms around the axis of rotation (a—a). Cavitation is caused in the distilland by oppositely directed forces acting on the distilland, said forces being the centrifugal force of the distilland vortex and the centripetal force of the vapor pump acting through the afferent mesial passage. A distilland surface (47) forms around the axis of rotation (a—a), and the work of the vapor pump continuously strips saturated vapor from the distilland surface, allowing further evaporation.

A toroid of vapor within the annular recess (45) is trapped by the efferent flow of distilland coming off the outer surfaces of the disk. Vapor goes through the holes (44), through the afferent mesial passage (43) and into the bore of the shaft (42). Flow of vapor into the afferent mesial passage is caused by the work of the vapor pump and the converging efferent flow off the surface of the conical elements, which flow squeezes vapor into the annular recess (45). Any entrained mist acquires too much angular momentum in proceeding afferently through the annular recess to follow the lighter vapor in its afferent mesial flow path through the holes. Mist droplets seed condensation of vapor and aggregate in the turbulent flow in the annular recess. Their greater density in cyclonic flow causes mist droplets to contact the surface of the annular recess and thence to be impelled back into the distilland. Vapor drawn past the holes (44) and through the afferent mesial passage (43) either condenses and goes up the shaft as mist or liquid, or it continues as vapor and is condensed by suitable means, such as the vapor chamber and vapor pump shown in FIG. 1. Particles, oil, algae, and other contaminants are left behind in the residue. A chamber design such as shown in FIG. 2 would allow separate collection of heavier and lighter than water contaminants continuously, without having to open the chamber.

Figure 3B:
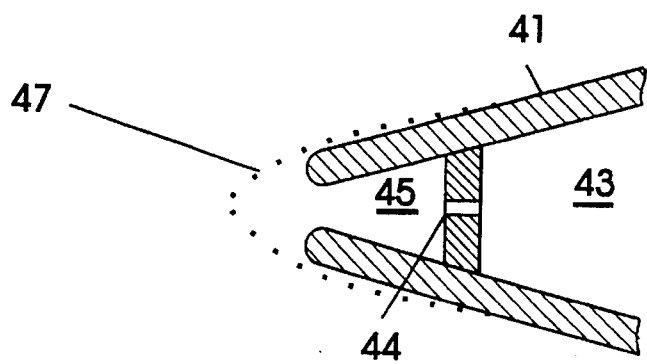
FIG. 3b shows the distilland surface created by the apparatus of FIG. 3a with hydrophobic distilland pump surfaces or high angular velocity.

FIG. 3b shows the distilland surface produced by the apparatus of FIG. 3a when angular velocity and the surface characteristics of the material on the outside surfaces of the conical elements of the distilland pump (41) suffice to produce a break in the contact of the distilland with the surface of the distilland pump, i.e. cavitation. The distilland surface (47) extends to a radius on the outside surface of the conical elements at which the distilland is able to maintain contact. Efferent flow from the impellers (46) traps the cavitation zone and squeezes vapor and non-condensable gases toward the annular recess (45). Teflon, or other hydrophobic materials, on the outside surfaces of the conical elements aids in the achievement of cavitation, as does higher angular velocity.

Figure 4A:
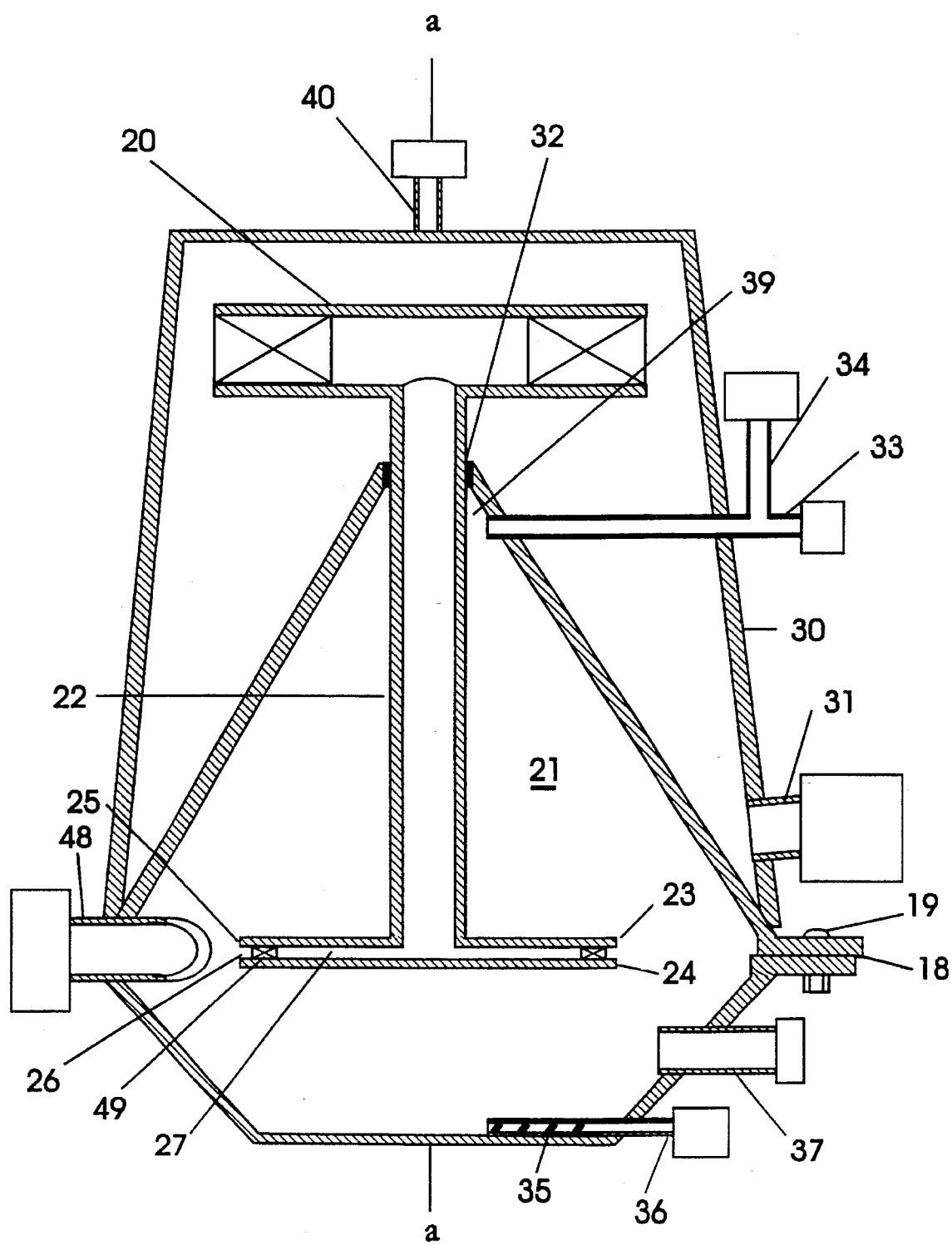
FIGS. 4a and 4b show a cut-away view of an alternative embodiment with the distilland vortex created by jetted distilland feed tangential to the afferent mesial passage and within a distilland tank.

FIG. 4a shows an alternative embodiment of the apparatus shown in FIG. 2, without a motor for rotating the distilland pump. Jetted distilland enters the distilland tank through a distilland jet port (48), which includes a pressure means (not shown) connected thereto for varying the feed pressure and the pressure of the liquid within the distilland tank. Many types of pressure means known to the art could be used, including a pump or a reservoir. The distilland jet port (48) is a tangential aperture in the wall of the distilland tank located approximately in the plane of the afferent mesial passage and distal to the axis of rotation (a—a). Flow from the distilland jet port is approximately in the plane of the afferent mesial passage (27) and tangential to the rims of the disks (23, 24) which are submerged in distilland. Impeller blades (49) connect the disks. The distilland pump in this alternative embodiment is the means connected to the feed pipe for jetting distilland, and no motor turns the disks of the distilland pump. The flow through the distilland jet port (48) creates a vortex in the tank. The distilland increases in angular velocity as it is squeezed by the pressure in the tank into the afferent mesial passage (27), until reaching a minimum vortex radius, where the centrifugal force from the increased angular momentum during afferent flow offsets the pressure of the distilland tank, according to known principles of vortex control devices.

The efferent centrifugal pull of the distilland vortex and the afferent centripetal pull of the vapor pump lower the pressure between them in the afferent mesial passage (27) to the vapor pressure of the distillate. Thus a distilland surface is formed around the axis of rotation (a—a) by these opposed forces. The distilland surface at the minimum vortex radius (50) evaporates. Saturated vapor is drawn afferently by means of the afferent pull of the vapor pump, the inlet of which communicates with the bore of the hollow shaft (22). Saturated vapor is continuously drawn off by means of the vapor pump as it is produced at the distilland surface. The vapor pump is turned by the force of the jetted distilland because it is fixed to the shaft. Either drag, as in a Tesla turbine, or force against an impeller on the distilland pump, would provide the means of translating the tangential force of the jelled distilland into rotation of the distilland pump and/or vapor pump.

Figure 4B:
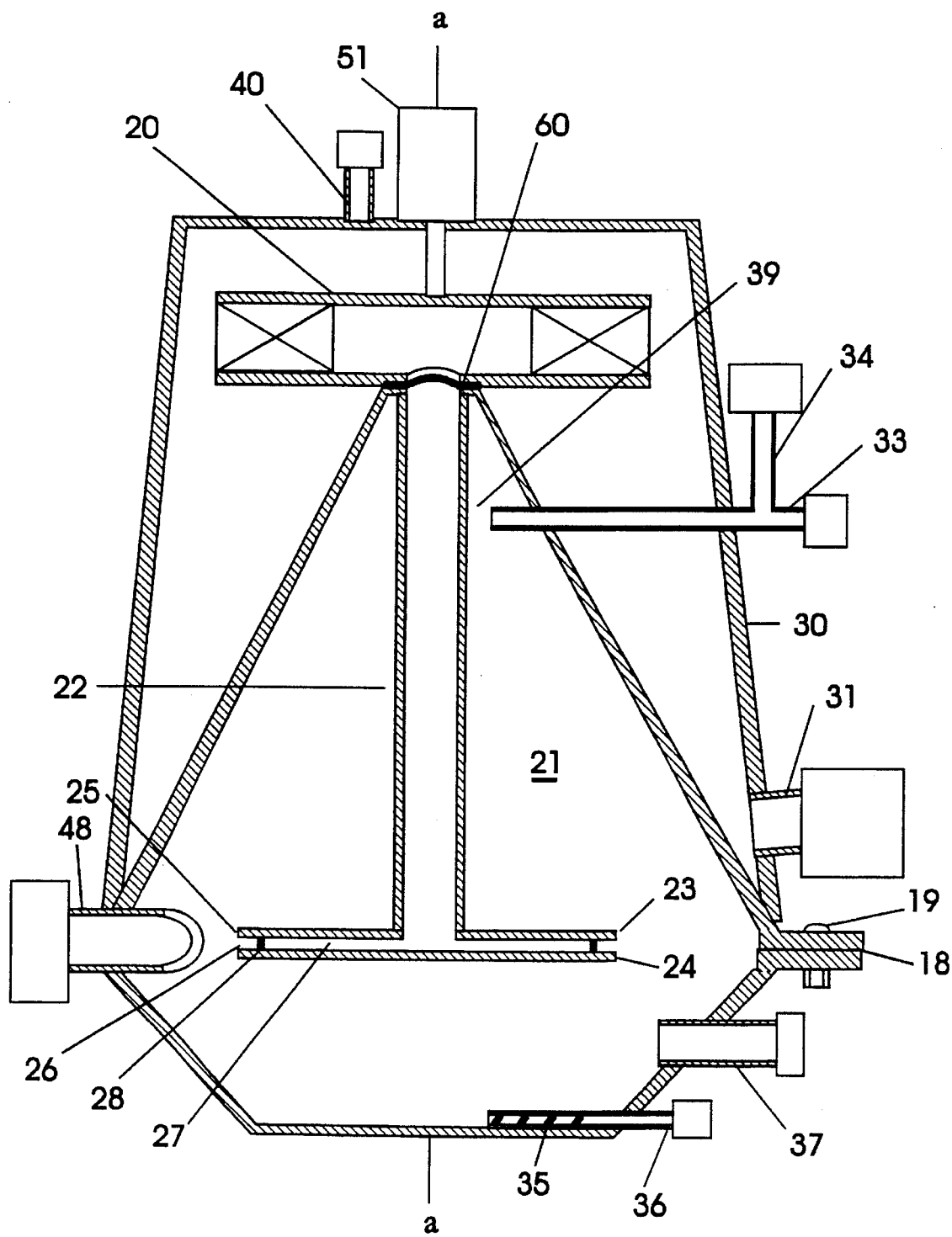

FIG. 4b shows a cross-section of an alternative embodiment of the apparatus described under FIG. 4a. In this embodiment, the disks (23, 24) do not rotate and have no impellers. The vapor pump is rotated by a vapor pump motor (51). The shaft does not rotate, and is fixed to the tank. A seal (60) comprising a thrust bearing connects the shaft to the vapor pump. The distilland vortex created by the jetted feed cannot enter the afferent mesial passage (27) because of its angular acceleration in afferent flow. This an application of the fluid diode known to the art of vortex control devices. Liquid is unable to flow afferently but vapor, which is less dense, is withdrawn by the vapor pump through the afferent mesial passage (27) in a plane approximately normal to the axis of rotation (a—a) and up the bore of the shaft (22) along the axis of rotation (a—a).

The withdrawal of saturated vapor from the afferent mesial passage (27) does not change the pressure, but only increases the rate of vaporization at the distilland surface at the minimum vortex radius. The withdrawal of vapor allows more distilland to come to the minimum vortex radius in a continuous evaporation cycle. Particles within the distilland undergo normal forces near the disks (11, 12) and flow efferently in the afferent mesial passage (27) in the doughnut-shaped recirculating flow pattern known to the art of vortex control devices.

Figure 5A:
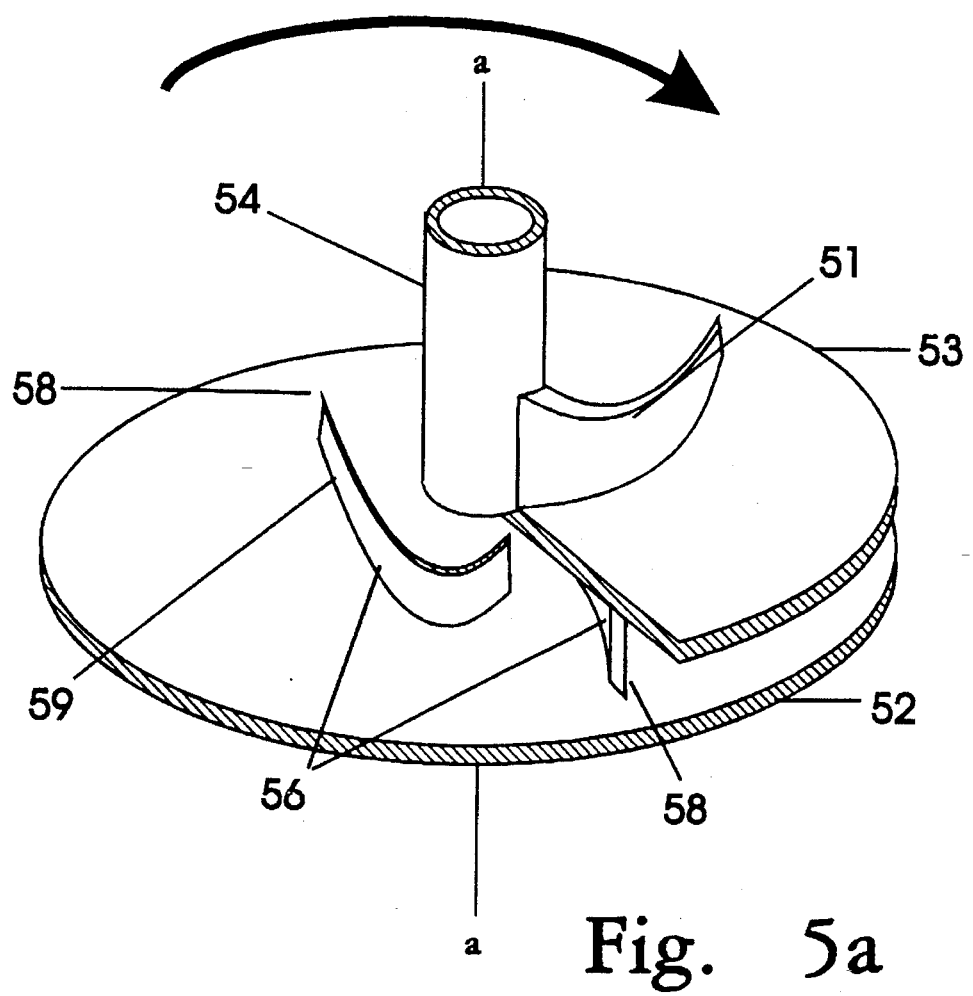
FIG. 5 is a cut-away view of an alternative embodiment of the distilland pump described in FIGS. 1 and 2, comprising impeller blades outside and centripetal pump volute vanes inside the disks of the distilland pump.
FIG. 5b shows a top view of the centripetal pump volute vanes.

FIG. 5a is a cutaway view of an alternative embodiment of a rotatable distilland pump, comprising efferent impeller blades (51) and an integral centripetal pump (56), which may be used in the devices described in the foregoing discussion of FIGS. 1 and 2. The distilland pump rotates on an axis of rotation (a—a) which lies approximately along the centerline of the hollow shaft (54). Impeller blades (51) fixed to the outer surfaces of the disks (52, 53) of the distilland pump serve as distilland vortex amplifiers, providing amplified vortex intensity and efferent flow along the outside surfaces of the disks as the distilland pump rotates. The direction of rotation is shown by the arrow.

Figure 5B:
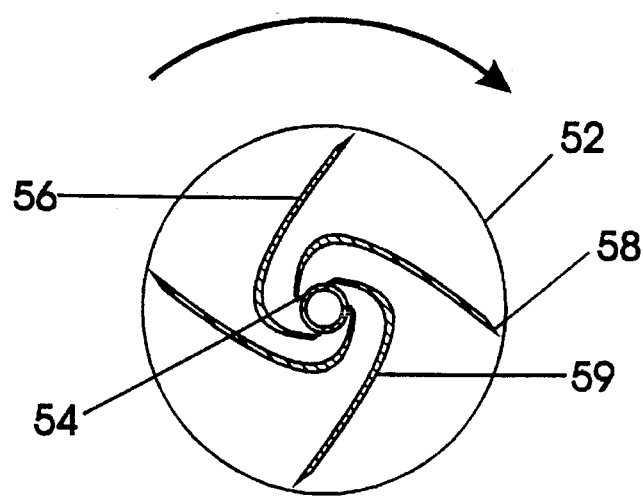

Within the afferent mesial passage defined by the disks (52, 53) are volute vanes (56) which connect the disks, giving additional structural strength to the distilland pump. The volute vanes curve in the direction of rotation. Thus, they scoop and condense saturated vapor as they rotate. The top disk (53) has been partially cut away to show the volute vanes (56) which function as vapor pump and vapor condenser means. The opposed actions of the vapor pump and the distilland pump create a saturated vapor, as discussed under FIGS. 1 and 2, and this saturated vapor condenses in a zone of pressure which is slightly higher than the vapor pressure, according to the well-known principle of physics that the addition of pressure to a saturated vapor does not change the pressure of the vapor but only produces condensation. Such a zone of higher pressure would be on the leading surfaces (58) of the volute vanes (56). Condensation on the leading surfaces (58) creates a vacuum drawing more vapor in and thus facilitating evaporation of the distilland. At the trailing surfaces (59) on the other side of the volute vanes is a region of slightly lower pressure, which facilitates transport of the produced vapor. Heat exchange occurs with the distilland across the disks of the distilland pump during condensation by means of the volute vanes. Distillate and/or vapor is impelled afferently and into the bore of the hollow shaft (54) by means of the volute vanes (56), which act as an inclined plane to the condensed distilland droplets on the leading surfaces (58). The droplets have no centrifugal force upon condensation and therefore roll up the leading surfaces (58) by inertia as the volute vanes rotate in the direction shown by the arrow. Hydrophobic material such as Teflon would be suitable for the volute vanes as such material would improve afferent flow of condensate. Any mist or vapor condensing on the inner disk surfaces acquires angular momentum and is flung outward by centrifugal force as the disks rotate, thus continuously washing the inner disk surfaces and preventing contamination of the distillate and accumulation of residue on the disks. The volute vanes (56) act as a centripetal vapor pump and vapor compressor, powered by the same means as the disks and impeller blades (51) of the distilland pump. The distillation method disclosed in the present invention may thus be implemented by a single integrated device rather than by means of distinct vapor pump and distilland pump. FIG. 5b shows a top view of the volute vane centripetal pump. The arrow indicates the direction of rotation.

Figure 6A:
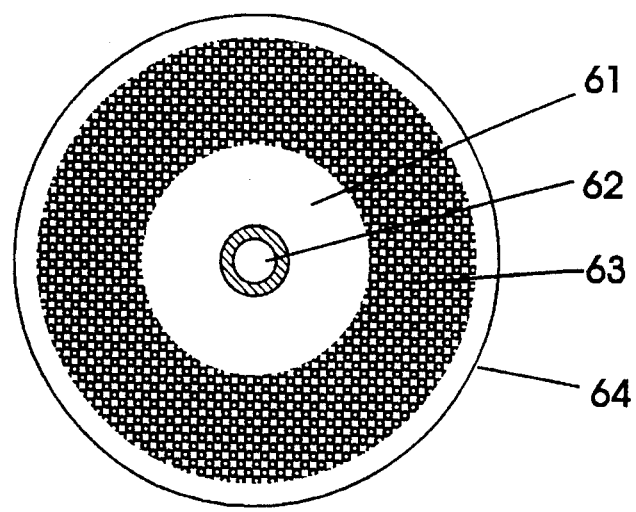
FIGS. 6a and 6b show a top view and a cross-sectional view, respectively, of an alternative embodiment of the afferent mesial passage, comprising holes in a disk surface defining the afferent mesial passage such that relative displacement of the distilland and the surface produces cavitation at these holes for the production of vapor.
Figure 6B:
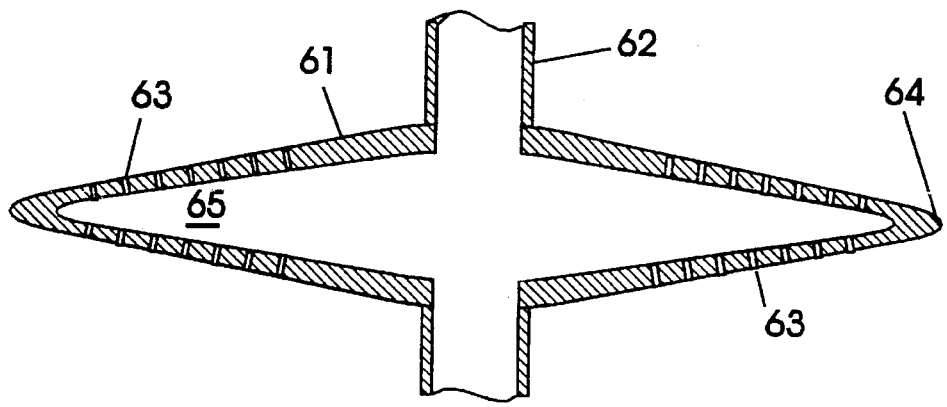

FIGS. 6a and 6b show a top view and a cross sectional view, respectively, of an alternative embodiment of the invention. The disk assembly (61) is attached coaxial to a hollow shaft (62), said disk assembly comprising two disks joining at a rim (64), defining a disk assembly interior (65), which is the afferent mesial passage for evaporation products toward the axis of rotation (a—a). At least one of said disk surfaces comprises holes (63) therethrough. Suitable means, such as described in FIGS. 1, 2, and 4, rotate the disk assembly (61) while it is submerged in the distilland. Cavitation fills the holes (63) with vapor and produces a distilland surface (67) over the holes. This vapor is confined within the holes (63) and is compressed and condensed therein by the pressure of the efferent and angular flow of distilland across the outside disk surface. To aid in cavitation, a hydrophobic material, such as Teflon, is used at the holes.

The inlet of a vapor pump (not shown) of suitable design (e.g. the vapor pump shown in FIG. 1) communicates with the bore of the hollow shaft (62). The bore of the hollow shaft (62) communicates by suitable means with the disk assembly interior (65), which is the afferent mesial passage for vapor flow into the shaft. Low pressure in the disk assembly interior (65) draws vapor formed by cavitation in the holes (63) into the disk assembly interior (65) thereby allowing further evaporation of the distilland at the distilland surface (67). Distillate and vapor are continuously withdrawn from the disk assembly interior (65) by the suction of the vapor pump through the shaft. A zone of saturated vapor (68) always separates the distilland from the distillate. Cyclonic flow of the mist droplets within the holes causes the mist to go to the hole wall, where it is impelled out to the distilland. Vapor goes to the center of the cyclone and is drawn through the holes (63) into the afferent mesial passage (65). Thus the mist and the vapor are impelled in opposite directions, and separate cyclonically. This alternative embodiment creates a large area for evaporation to take place. Vapor condensing at the holes (63) would give off latent heat, and over continuous use the disk assembly would tend to become hot. The disk assembly contains copper or other material which would act as a heat sink and conduct heat away from the holes, thus improving the durability of this device.

Figure 6C:
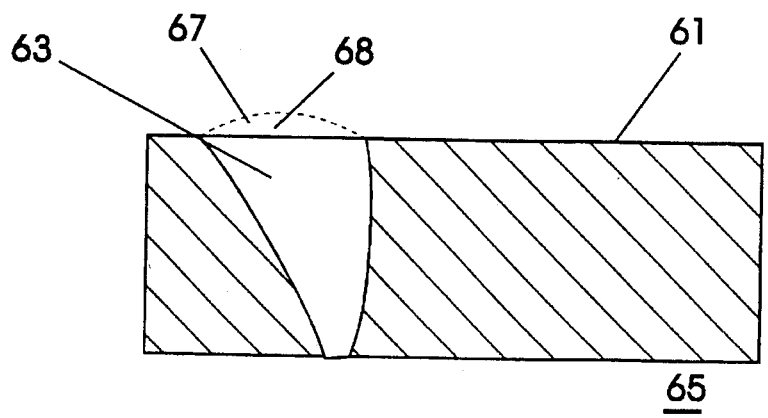
FIG. 6c shows a detail of the holes which are tapering tubular passages, with their diameters decreasing at least some distance from their inlet to their outlet in a sort of trumpet shape.

FIG. 6c shows a detail of the cross-section of the disk assembly (61), showing the holes (63), the disk assembly interior (65), and the distilland surface (67). The holes are tapering tubular passages having smooth walls, with their diameters decreasing at least some distance from their inlet to their outlet in a sort of trumpet shape. The holes are longer than they are wide. The taper increases the angular velocity of the vapor/mist mixture as it is drawn into the disk interior, thus separating the mist from the vapor because of the greater density of mist in cyclonic rotation. Once the accelerated mist contacts the surface of the hole, it is impelled back into the distilland. Vapor and gas proceed up the axis of the cyclone.

Figure 7:
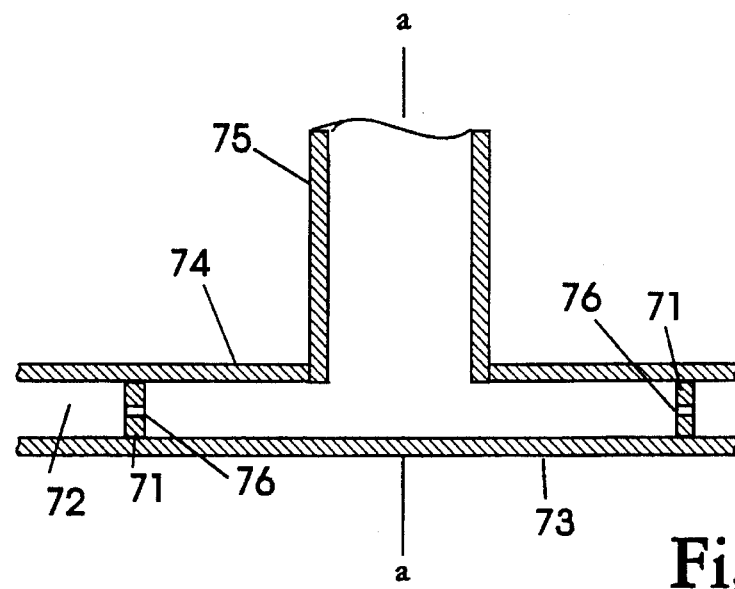
FIG. 7 shows a detail of a cross-section of an alternative embodiment of the distilland pump referenced in FIGS. 1 and 2, comprising a hole band concentric with the hollow shaft and across the afferent mesial passage.

FIG. 7 shows a detail of a cross-section of an alternative embodiment of the distilland pump referenced in FIGS. 1 and 2, comprising a hole band (71) concentric with the hollow shaft (75) and located within the afferent mesial passage (72) between the rotatable disks (73, 74). The hole band (71) connects the disks, thus providing additional structural stability to the distilland pump while it is submerged in distilland. There may be several concentric hole bands in a distilland pump. Holes (76) through the hole band (71) amplify the pressure differential between the vapor pump (not shown, see FIG. 1), and the distilland vortex created by the distilland pump in rotation about the axis of rotation (a—a), by reducing the area through which the opposed forces of these pumps act.

Figure 8:
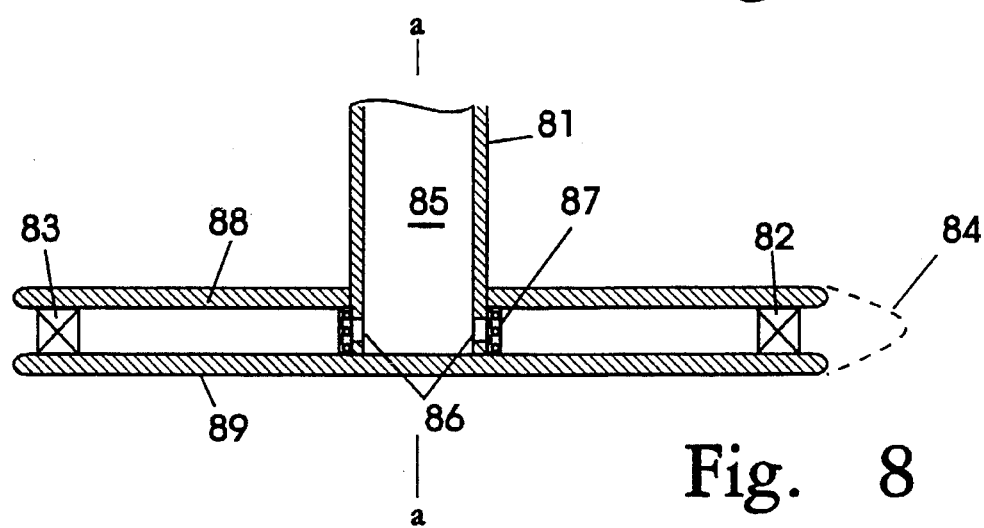
FIG. 8 shows an alternative embodiment of a distilland pump, comprising efferent impellers across the afferent mesial passage.

FIG. 8 shows an alternative embodiment of the invention having efferent impellers across the afferent mesial passage. The shaft (81) rotates about axis of rotation (a—a). Impeller blades (82, 83) create an annular distilland surface (84) around the shaft. Approximately parallel disks (88, 89), approximately normal to the axis of rotation (a—a) and connected to the shaft and the impeller blades, define an afferent mesial passage. The vapor produced at the distilland surface is withdrawn past the impellers into the bore (85) of the shaft (81) by a vapor pump of suitable design (not shown), such as the centrifugal fan shown in FIG. 1. The input of the vapor pump communicates with the bore (85) of the shaft (81). The afferent mesial passage communicates with the bore (85) through holes (86) in the shaft (81). These holes (86) may be covered by filter medium (87) for additional security against distilland intrusion, and to aid in condensation of the vapor. However, filter media provide a home for micro-organisms. The same vapor/mist separation as with the rotating disks occurs by differential centrifugal force of the vapor and the entrained mist.

Figure 9:
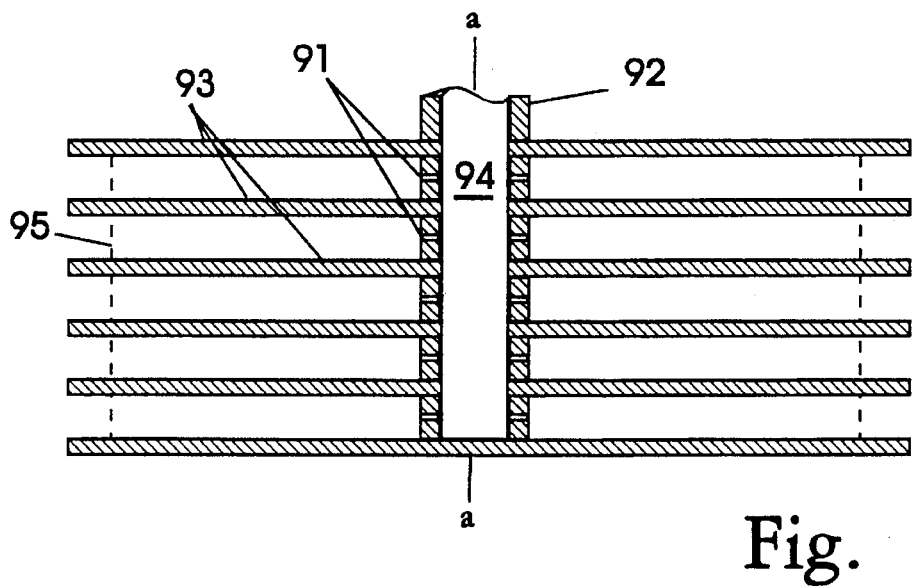
FIG. 9 shows a cross-section of a multiple disk embodiment of a distilland pump and/or vapor/mist separator.

FIG. 9 shows a cross-section of a multiple disk embodiment, with shaft holes (91) through the shaft (92) between multiple parallel disks (93) attached to the shaft. The disks (93) define afferent mesial passages between them, and the shaft holes (91) permit communication between these afferent mesial passages and the bore (94) of the shaft (92). A vapor pump of suitable design (not shown), such as the centrifugal fan shown in FIG. 1, withdraws fluid from the bore of the shaft (92). A distilland surface (95) forms between or external to the disks (93) when the distilland in which they are submerged is caused to rotate about the axis of rotation (a—a). The shaft and the disks rotate so that vapor/mist separation is accomplished by cyclonic flow of the vapor/mist mixture. The rotating disks efferently impel mist droplets contacting their surfaces, and cylconic afferent flow caused by the vapor pump (not shown) causes the mist droplets to contact a disk surface. The vapor, being less dense, is less impeded in afferent flow to the holes, and proceeds afferently toward the axis of rotation (a—a) in the center of cyclones between the disks. Closely spaced disks would have finer separation but less throughput of vapor. Of course, that feature would make narrowly spaced parallel rotating disks suitable for scrubbing gas of unwanted vapor, which would condense by impingement pressure against the disks due to the cyclonic vortices. Vapor would condense on the disk surfaces along with the mist and be efferently impelled.

Figure 10:
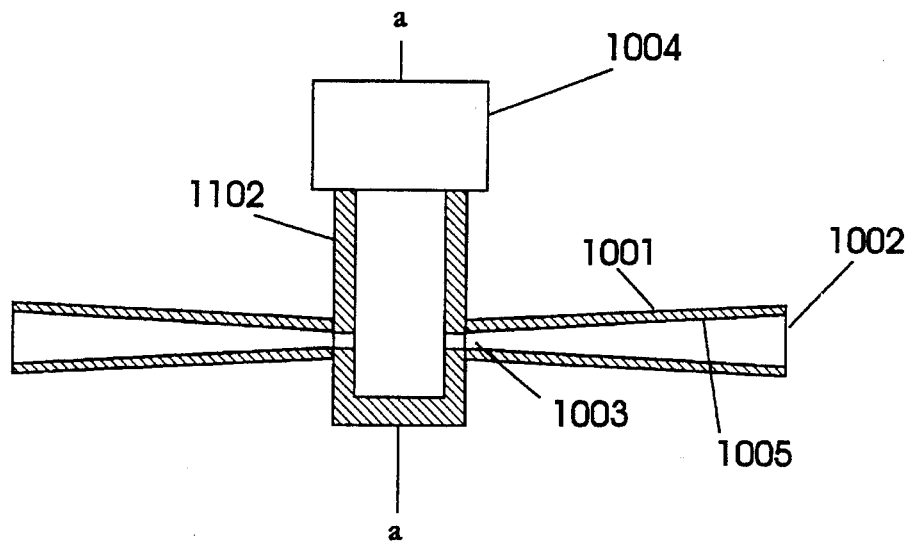
FIG. 10 shows a cross-sectional view of a dynamic gas purification device which comprises tapering tubular passages, the inlets of which rotate in the gas.

FIG. 10 shows a cross-sectional view of a dynamic gas purification device which comprises tapering tubular passages, the inlets of which rotate in the gas. The diameter of the inlet (1002) of the tapering tubular passages (1001) is greater than the diameter of the outlet (1003). The outlet communicates with a vacuum created by a pump (1004), which may be a centrifugal pump or other means known to the art. The vacuum means (1004) draws a vacuum which causes flow of a vapor/mist mixture through the tapering tubular passages (1001), which rotate about an axis of rotation (a—a). Motion of the tapering tubular passages relative to the vapor/mist mixture causes a cross-flow across the inlet (1002). Of course, the relative displacement of the inlet and the vapor/mist mixture might also be produced without rotation of the tapering tubular passages simply by blowing the mixture over the inlet. A vortex is created at the inlet by the crossed afferent and angular vectors impressed on the fluid by the rotation of the tapering tubular passages and the afferent pull of the vapor pump. Decrease in the diameter of the tapering tubular passages causes an increase in the angular velocity of the vortex. The mist droplets in the vortex, which, being liquid, are more dense than the gaseous vapor, are whirled to the inner wall (1005) of the tapering tubular passage by their greater centrifugal force about the axis of rotation of the vortex. Scrubbed vapor proceeds up the center of the vortex, while mist is spun out by its centrifugal force in a narrow channel, so mist quickly contacts the wall of the tapering tubular passage. The mist at the wall collects into larger droplets and exits the tapering tubular passage by gravity and by the centrifugal force caused by rotation of the tapering tubular passage about the axis of rotation (a—a).

Figure 11A:
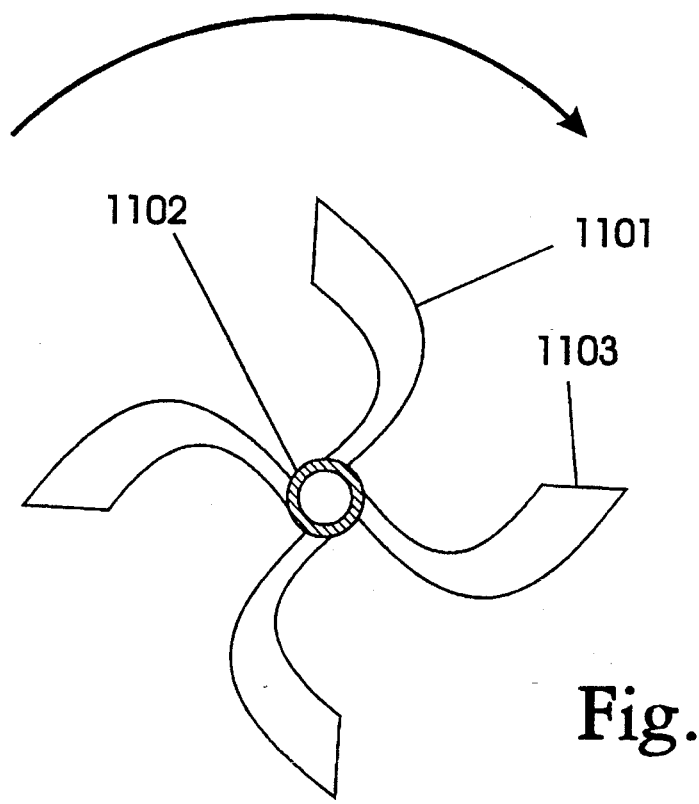
FIGS. 11a and 11b show, respectively, a top view and a cross-section of an alternative embodiment comprising spiral tubular afferent mesial passages communicating with the bore of a hollow shaft in a plane normal to the axis of rotation.

FIG. 11a shows a top view of an alternative embodiment of the afferent mesial passage, comprising a number of rotatable tubes (1101). The tubes lie in the same plane and curve away from the direction of rotation, which is shown by the arrow. These tubes communicate with the bore of a hollow shaft (1102), which bore communicates with the inlet of a vapor pump (not shown). The diameter of these tubes at their point of communication with the bore of the hollow shaft is preferably smaller than at their intake (1103). An alternative is the standard impeller design for swimming pool pumps, which comprises two approximately parallel surfaces and curved walls from the rim to the intake. In this invention, of course, such a design would be for afferent rather than efferent flow.

Figure 11B:
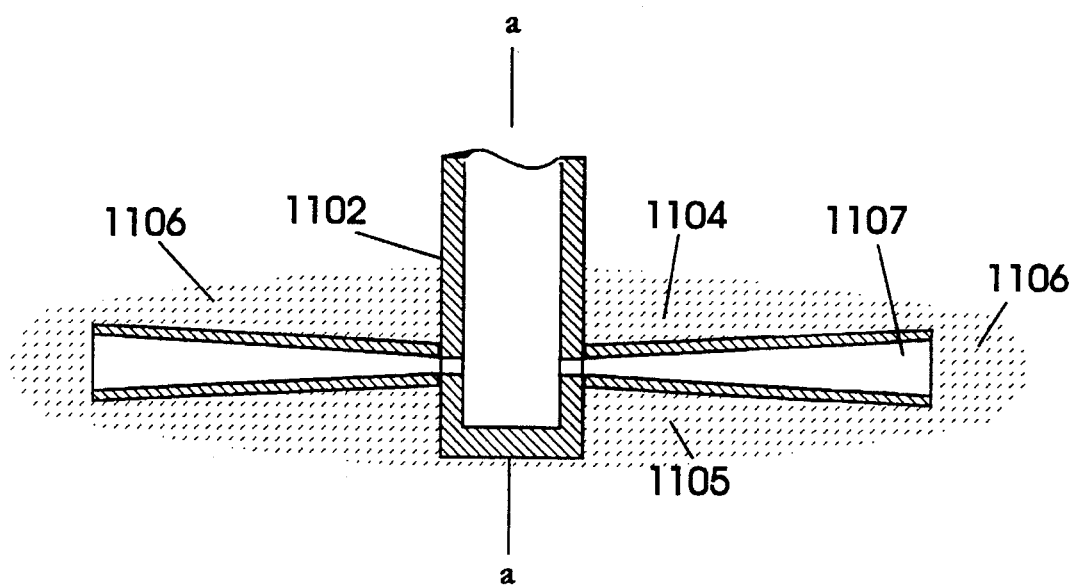

FIG. 11b shows a cross-section of the alternative embodiment comprising tubular afferent mesial passages communicating with the bore of a hollow shaft. The top cavity (1104) and bottom cavity (1105) resulting from the decreasing diameter of the tubes as they go to the hollow shaft (1102) are regions of supercavitation as the tubes rotate. Vapor comes off the distilland surface (1106) and is drawn into the tubes, where it is scrubbed by afferent flow. Mist contacting the tube surfaces is efferently impelled by the rotation of the tubes, while vapor is afferently impelled by the vacuum drawn by the vapor pump. The decrease in tube diameter increases the cyclonic angular velocity of the vapor/mist mixture as it flows afferently to the bore of the hollow shaft, thus causing the mist droplets, which are more dense than the vapor in this vortex, to contact the tube wall and then be efferently impelled back out into the distilland.

At the intake (1107) of the tubes is a distilland vortex caused by the impelling effect of the rotation of the tubes, and the centrifugal force of this vortex is approximately in the plane of the afferent mesial passage.

Figure 12:
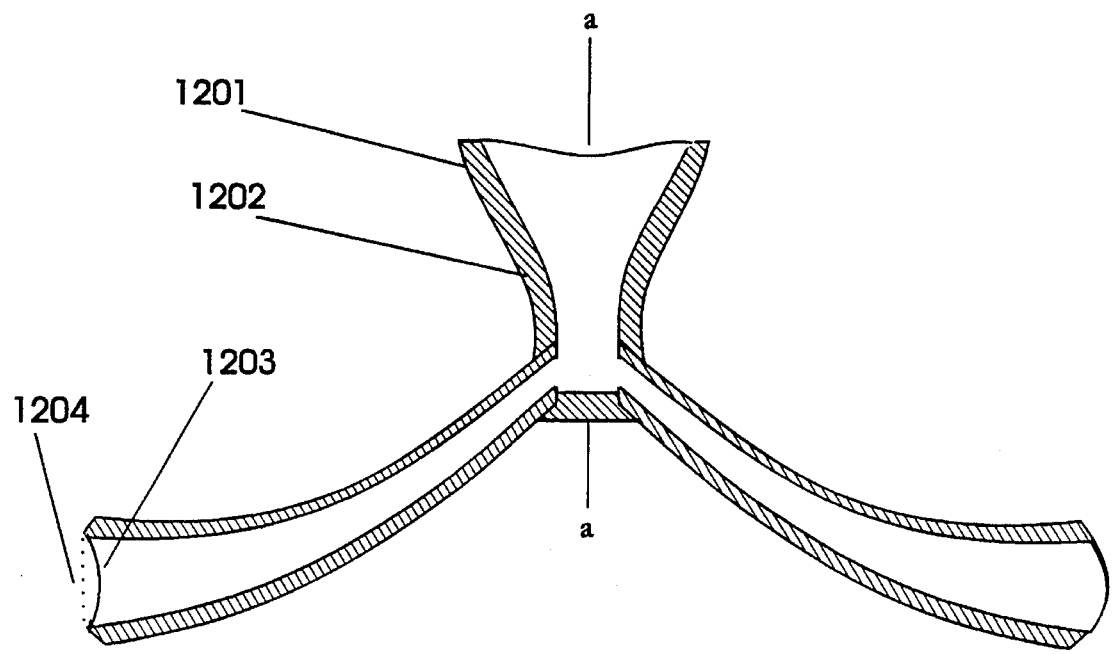
FIG. 12 shows a cross-section of an alternative embodiment of the tubular afferent mesial passages, wherein the tubes curve longitudinally to the hollow shaft before communicating with the bore and the shaft has an inverted bell-shaped cross-section.

FIG. 12 shows a cross-section of an alternative embodiment of the tubular afferent mesial passage. The tubes do not lie in a plane normal to the hollow shaft (1202) but curve longitudinal to the axis of rotation (a—a), making them longer for additional scrubbing effect. The communication with the bore of the shaft does not occur in the plane of the intake (1203). The shaft (1202) has an inverted bell-shape (1201) in cross-section so that rotation impels condensate on the interior shaft surface upwards. At the distilland surface (1204), the centrifugal force of the distilland vortex opposes the centripetal force of the vapor pump, thus lowering the pressure at the distilland surface to the vapor pressure of the distillate. The tubes and shaft are preferably glass.

OPERATION, RAMIFICATIONS, AND SCOPE

A large controlled bubble of cavitation is formed within the distilland by opposed centrifugal and centripetal forces in the plane of the afferent mesial passage. Thus a distilland surface forms around the axis of rotation, and saturated vapor is continuously stripped from this distilland surface by the work of the vapor pump, which also creates the centripetal force. The vapor vortex within this cavitation region ejects by centrifugal force whatever in it is denser than pure vapor, including any particles or droplets which may somehow become entrained in the vapor. Bubbling at the distilland surface, which might produce mist, is suppressed by centrifugal force. Vapor is compelled to follow an afferent flow path, and is scrubbed by cyclones in the afferent mesial passage. Scrubbed vapor is then withdrawn from within the distilland along the axis of rotation.

In contrast to all other vacuum distillation devices and methods, no container is necessary for the distilland and no heat is added to produce evaporation. Therefore, when this method or apparatus is used with untreated seawater, scale will not form because the requisite heat for the scale-forming chemical reactions is absent. Used on other distillands, such as in food or beverage evaporation, unwanted chemical reactions due to heat are avoided.

Energy efficiency for vacuum distillation processes will be improved by avoiding the wasteful use of heat for vaporization. Energy efficiency is also improved by utilizing the centrifugal force of the distilland as an opposing force to the action of the vapor pump, so that the unimpeded action of two opposed pumps, rather than the work of one pump working alone, produces the vapor pressure of the desired liquid.

Not only liquids are separated by this method and apparatus, but non-condensable gases can be separated from liquids. Dissolved gases are evolved and separated from the liquid by reducing the pressure of the distilland, and then are separated from condensable gases by their lesser centrifugal force in rotation within the condensation chamber.

Gases contaminated by mist, vapor, and/or particulates, for example, smokestack emissions, diesel exhaust, and wet steam, could also be purified by the cyclonic scrubbing means disclosed herein. An array of rotatable closely-spaced disks mounted on a hollow shaft connected to vacuum means would cyclonically scrub any contaminants which are heavier than the gas. Volatile organic vapors and/or water vapor would condense by impingement pressure against the means defining the afferent mesial passage, such as the rotating disks, and be flung outward, while non-condensable gases proceed inward through the center of the cyclonic vortices. Stretching the vortex axis by the suction pump accelerates the vortex and thus increases the impingement pressure for condensation of vapors.

The method and apparatus described above could be used to separate pure liquid from a distilland, even from dense slurries. Solids, colloids, and ions are separated out by evaporation and mist separation means leaving them behind. The produced vapor could be fractionated in cascading distillation units, as is known to the art and practiced in distillation columns. Such cascading units could be of the design of the present invention design or other designs known to the art of fractionation. For de-watering of wastewater, the produced vapor would be of sufficient purity for immediate discharge into the environment, leaving a concentrated residue for storage, transportation, and further treatment.

Refrigeration is another application of the rotary afferent method and apparatus disclosed in this invention. Cooling applications are covered by a separate patent application filed by the inventor. However it should be noted here that the latent heat released by the vapor upon condensation finds a heat sink in the distilland, which is cooled by the evaporative process, thus the energy within the system is conserved and the distilland is maintained at approximately the same temperature.

Either a centrifugal distilland pump with a centrifugal vapor pump, as shown in FIG. 1, or another combination of pumps may be used. For example, a helical impeller within the hollow shaft, as shown in FIG. 2, could be used as the sole vapor pump. Or a centripetal pump in the afferent mesial passage, such as volute vanes between the disks of the distilland pump, as shown in FIG. 5, could function as the sole vapor pump. A single motor could move both pumps at the same time, or the motive force of tangentially jetted distilland could move both the distilland pump and the vapor pump by drag or pressure upon the distilland pump, as shown in FIG. 4. Impellers of the distilland pump could be either horizontal, as shown in FIGS. 1, 2, 3, 4, and 9, or vertical, as shown in FIGS. 5 and 8. The area of the connection between the bore of the shaft and the afferent mesial passage could be narrowed, as shown by the hole band in FIG. 7, so as to magnify the pressure differential between the vapor pump and the distilland pump, thus reaching vapor pressure more easily because the opposed forces act at a smaller area.

The tapering tubular passages shown in FIG. 12 are in part approximately parallel to the axis of rotation, as are the holes of FIG. 6, rather than approximately normal to the axis of rotation as in FIG. 11. However, no matter what angle the tapering tubular passage might be relative to the axis of rotation, the principle of operation remains the same: a vortex centrifugates the mist from the vapor in a vapor/mist mixture and either causes the mist to contact a condensing surface or expels the mist directly back to the distilland. Mist centrifugation is also produced in the embodiments described in FIGS. 1, 2, 3, 4, 8, 9, and 10 within the planar afferent mesial passages.

With the vapor scrubbing means described above, cheap high purity water supplies may be made available for medical use, food processing, electronics production, boiler feed, and agriculture, even where the tap or ground water is hard or brackish. With the cold distillation means described above, clean vapor may be produced without the heat that produces scale.

Clay slurries, colloidal suspensions, and bloody-water could be dewatered by the present invention. Since there is no membrane, there is no membrane clogging at all. The distillate would be free of bacteria, viruses, sugars, pyrogens, and metal ions. Cooling of the distillate would increase the viscosity of the contaminants, thus aiding collection and separation.

Dewatering of contaminated water would make possible savings in transportation, storage, and disposal costs, which is be of importance to industries such as nuclear power, oil, metals, and food processing.

The vapor produced by this method and apparatus may be heated to produce pure superheated steam. The condensate coming from a boiler could by these means be continuously purified, allowing for re-use of boiler water in a closed circuit, and the blowdown from the cooling means could thus be purified prior to discharge.

Food processing applications include evaporation without heat. Water supplies for food and beverage production may thus be purified economically. Wastewater from food and beverage processing could be dewatered so as to leave a smaller volume for disposal, and the water in the wastewater could be re-used.

An alternative vortex amplifier would be spiral grooves on the surface of the disk. Vortex amplifiers would be particularly useful in an unchambered design, such as for use at sea for producing fresh water aboard drilling platforms or ships, or for use in producing water for agriculture from bodies of brackish water.

With proper design, the same motor could provide rotation for the vapor pump and the distilland pump connected together by the hollow shaft. A portable water purification/ refrigeration device according to the present invention could be mounted on a truck and powered by the truck engine by means of a belt drive on one or more of the tires. By such a device, toxic waste could be concentrated at its place of production, saving transportation costs.

An apparatus according to the present invention could function as a low maintenance pool fountain and cleaner. Three-way separation of oils, solids, and water would be possible with a design such as shown in FIG. 2. No chlorination or sand filters would be necessary.

Parallel disks, mounted on a hollow shaft communicating with vacuum means, or tubular passages as described in FIGS. 6, 11, and 12, would provide vapor-mist separation means which could be added to existing boilers or vacuum or heat distillation processes or apparatus in order to purify the vapor coming off the distilland surface. The present invention would be a compact and economical alternative to the towers and bulky and disposable de-misters known to the art of vapor-mist separation.

Those skilled in the art upon reading the above detailed description of the present invention will appreciate that many modifications of the method and apparatus described above can be made without departing from the spirit of the invention. All such modifications which fall within the scope of the appended claims are intended to be covered thereby.

I claim:

1. An apparatus for vacuum distillation, comprising a combination of:

means for creating a vortex in a distilland about an axis of rotation;

means for defining an afferent mesial passage,
the afferent mesial passage having an inlet distal to said axis of rotation and an outlet proximal to said axis of rotation, the outlet communicating with an inlet of a pump, and the inlet communicating with the distilland, said means for defining an afferent mesial passage being selected from the group consisting of parallel disks, conical elements, tubes, and a hollow disk, wherein the hollow disk being centered on the axis of rotation and having tubular passages through at least one of its surfaces, the inlet of said tubular passages being the inlet of the afferent mesial passage;

means for pumping vapor radially inward through the afferent mesial passage so as to remove vapor continuously from the surface of the distilland across the inlet of the afferent mesial passage, thereby allowing for continuous evaporation of the distilland at said surface; and means for condensing vapor to produce a distillate;

wherein the vapor pressure of a distillate is created through opposed centrifugal and centripetal forces in the distilland, the centripetal force being due to said means for pumping vapor and the centrifugal force being due to said means for creating a vortex in the distilland, with said opposed forces being focussed through the afferent mesial passage.

2. The apparatus of claim 1, further comprising a hollow shaft having a bore and having its centerline along the axis of rotation, the bore communicating at one end thereof with the outlet of the afferent mesial passage and at the other end thereof with the pump.

3. The apparatus of claim 1, wherein said tubes taper between the inlet and the outlet.

4. The apparatus of claim 1, wherein said means for defining an afferent mesial passage is rotatable about the axis of rotation.

5. The apparatus of claim 1, wherein said means for creating a vortex in a distilland comprises impellers on said means defining an afferent mesial passage.

6. The apparatus of claim 1, wherein the means for pumping vapor comprises a vapor pump having its inlet communicating with the afferent mesial passage.

7. The apparatus of claim 1, wherein the means for pumping vapor comprises volute vanes disposed within the afferent mesial passage.

8. The apparatus of claim 1, wherein the means for pumping vapor comprises a pump disposed within a hollow shaft, said shaft having a bore communicating with the afferent mesial passage.

9. The apparatus of claim 1, wherein said means for creating a vortex in a distilland comprises means for jetting the liquid tangential to the afferent mesial passage.

10. Apparatus for desalination of salt water, comprising:

a rotatable distilland pump comprising at least two parallel disks defining between them an afferent mesial passage at least in part in a plane normal to the axis of rotation of the distilland pump, a vapor pump having an inlet and an outlet, means for rotating the vapor pump and the distilland pump, a hollow shaft connecting the vapor pump and the distilland pump, the shaft having a bore communicating with both the inlet of the vapor pump and the afferent mesial passage, such that a closed path exists through the afferent mesial passage and through the bore into the inlet of the vapor pump, and means for condensing water vapor, said condensing means communicating with the outlet of the vapor pump.

11. The apparatus of claim 10 wherein said means for condensing water vapor comprise means for heat exchange between the water vapor and the salt water.

12. The apparatus of claim 10, wherein said means for condensing water vapor comprise means for venting non-condensable gases.

13. The apparatus of claim 10, further comprising a helical surface within the bore of the shaft, which shaft is rotatable.

* * * * *